(12) United States Patent
Bisang et al.

(10) Patent No.: US 9,759,001 B2
(45) Date of Patent: Sep. 12, 2017

(54) ROTARY-LEAF/-CASEMENT DRIVE

(71) Applicant: GILGEN DOOR SYSTEMS AG, Schwarzenburg (CH)

(72) Inventors: Hans Rudolf Bisang, Regensdorf (CH); Ivan Wismer, Laupen (CH); Ernst Burri, Schwarzenburg (CH)

(73) Assignee: GILGEN DOOR SYSTEMS AG, Schwarzenburg (CH)

( * ) Notice: Subject to any disclaimer, the term of this patent is extended or adjusted under 35 U.S.C. 154(b) by 193 days.

(21) Appl. No.: 14/396,147

(22) PCT Filed: Apr. 5, 2013

(86) PCT No.: PCT/EP2013/057239
§ 371 (c)(1),
(2) Date: Oct. 22, 2014

(87) PCT Pub. No.: WO2013/160087
PCT Pub. Date: Oct. 31, 2013

(65) Prior Publication Data
US 2015/0114176 A1    Apr. 30, 2015

(30) Foreign Application Priority Data

Apr. 23, 2012  (CH) .......................................... 550/12

(51) Int. Cl.
*F16H 37/06*   (2006.01)
*E05F 1/10*    (2006.01)
(Continued)

(52) U.S. Cl.
CPC ............ *E05F 1/1041* (2013.01); *E05F 1/105* (2013.01); *E05F 15/00* (2013.01); *E05F 15/603* (2015.01);
(Continued)

(58) Field of Classification Search
CPC ..... E05F 1/1041; E05F 15/603; E05F 15/614; E05F 1/105; E05F 15/00; F16H 33/02; G05G 5/04
See application file for complete search history.

(56) References Cited

U.S. PATENT DOCUMENTS

| 2007/0137110 A1* | 6/2007 | Liles | ....................... E05F 1/105 49/350 |
| 2008/0092446 A1* | 4/2008 | Bienek | ..................... E05F 3/00 49/334 |
| 2010/0089190 A1 | 4/2010 | Busch | |

FOREIGN PATENT DOCUMENTS

| CH | EP 1505242 A1 * | 2/2005 | ............. E05F 3/104 |
| CN | 101080542 A | 11/2007 | |

(Continued)

OTHER PUBLICATIONS

International Preliminary Report on Patentability and English translation of the Written Opinion of the International Searching Authority (Forms PCT/IB/338, PCT/IB/373 and PCT/ISA/237), dated Nov. 6, 2014, for International Application No. PCT/EP2013/057239.

(Continued)

*Primary Examiner* — Zakaria Elahmadi
(74) *Attorney, Agent, or Firm* — Birch, Stewart, Kolasch & Birch, LLP

(57) ABSTRACT

The present invention relates to a rotary drive (100) comprising: an output shaft (330); a motor (20), acting on the output shaft (330) via a downstream gear mechanism (30); an energy-store module with a linear line of action and with transmission elements (32, 326) to apply pressure circumferentially to an eccentric cam disk (331) arranged on the output shaft (330) for conjoint rotation therewith; and an intermediate shaft (320), being offset in relation said line of action and being provided between the motor (20) and the output shaft (330). The transmission elements (32, 326)

(Continued)

comprise a roller lever (32), having a cam-follower roller (326) spaced apart from the intermediate shaft (320), wherein the cam-follower roller (326), pressed circumferentially against the eccentric cam disk (331), interacts with the output shaft (330). The energy-store module is arranged on the motor side in relation to the intermediate shaft (320).

20 Claims, 5 Drawing Sheets

(51) Int. Cl.
    *E05F 15/603* (2015.01)
    *E05F 15/614* (2015.01)
    *E05F 15/00* (2015.01)
    *F16H 33/02* (2006.01)
    *G05G 5/04* (2006.01)

(52) U.S. Cl.
    CPC .......... *E05F 15/614* (2015.01); *F16H 33/02* (2013.01); *G05G 5/04* (2013.01); *E05Y 2201/604* (2013.01); *E05Y 2201/638* (2013.01); *E05Y 2800/236* (2013.01); *E05Y 2800/238* (2013.01); *E05Y 2800/242* (2013.01); *E05Y 2900/132* (2013.01); *E05Y 2900/148* (2013.01); *Y10T 74/19051* (2015.01); *Y10T 74/20636* (2015.01)

(56) References Cited

FOREIGN PATENT DOCUMENTS

| DE | 10 2007 002 650 A1 | 7/2008 | |
| DE | 102007002650 A1 * | 7/2008 | ............ E05F 3/104 |
| EP | 1 092 829 A2 | 4/2001 | |
| EP | 1 505 242 A1 | 2/2005 | |

OTHER PUBLICATIONS

International Search Report, issued in PCT/EP2013/057239, dated Oct. 25, 2013.
Written Opinion of the International Searching Authority, issued in PCT/EP2013/057239, dated Oct. 25, 2013.

* cited by examiner

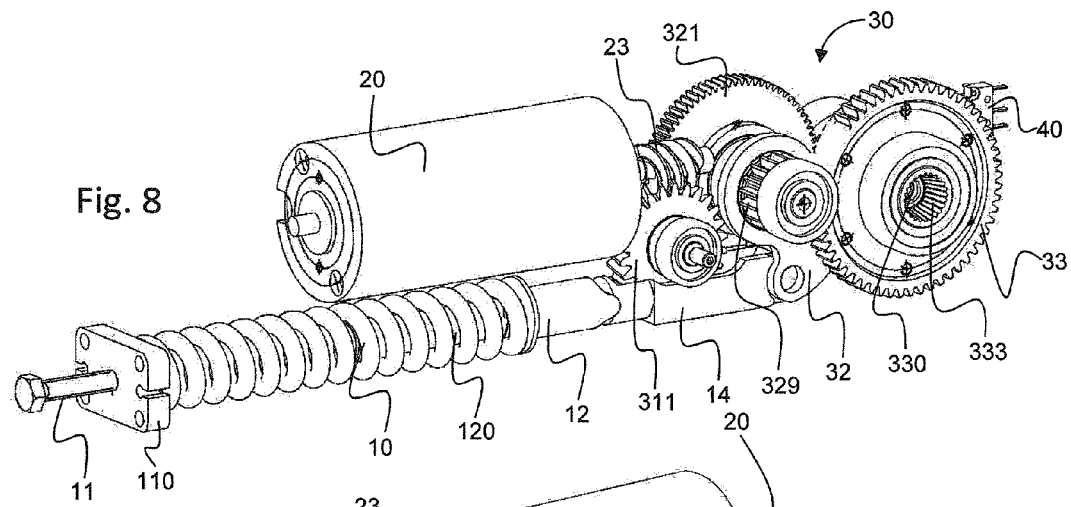
Fig. 8
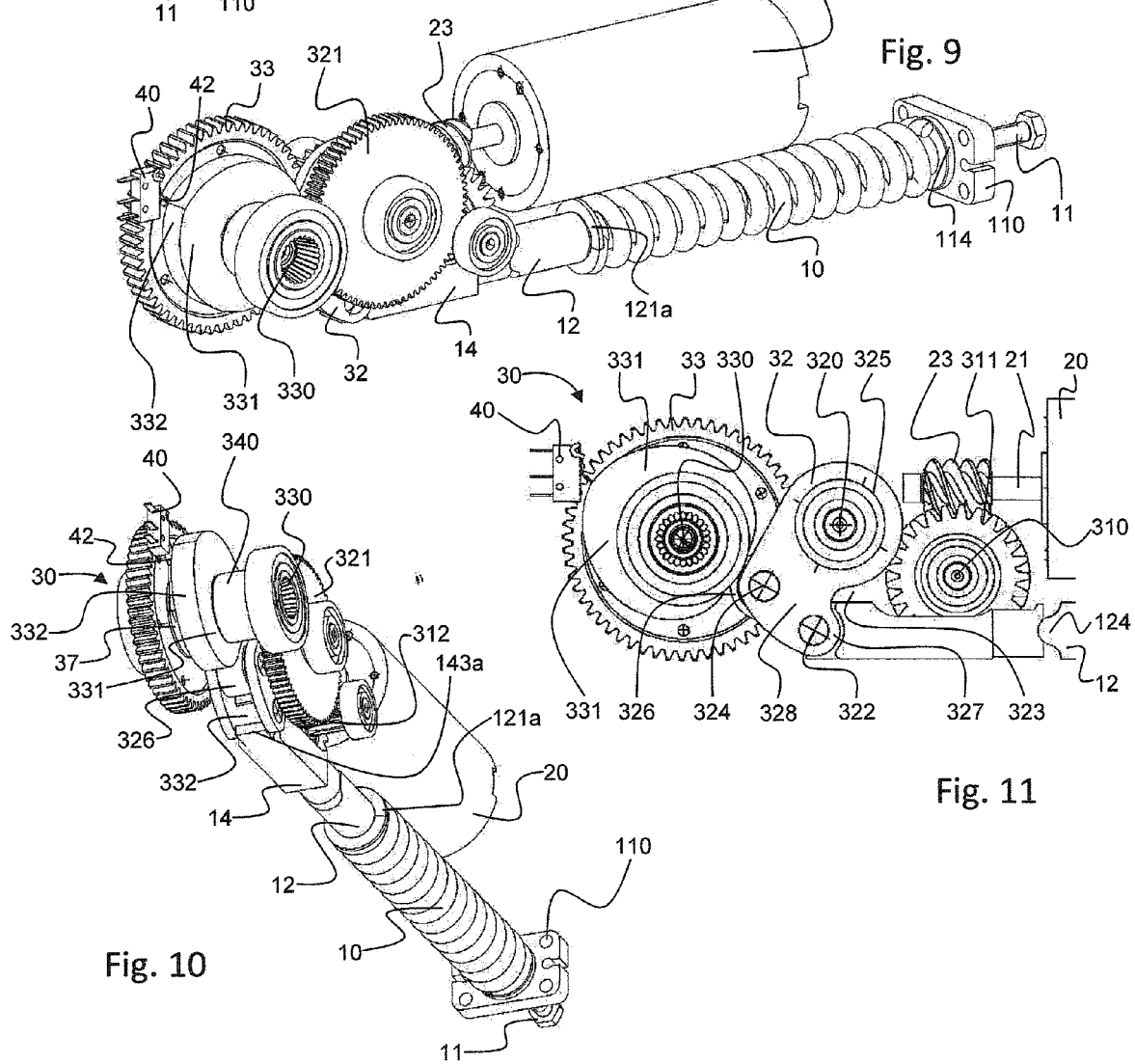
Fig. 9
Fig. 10
Fig. 11

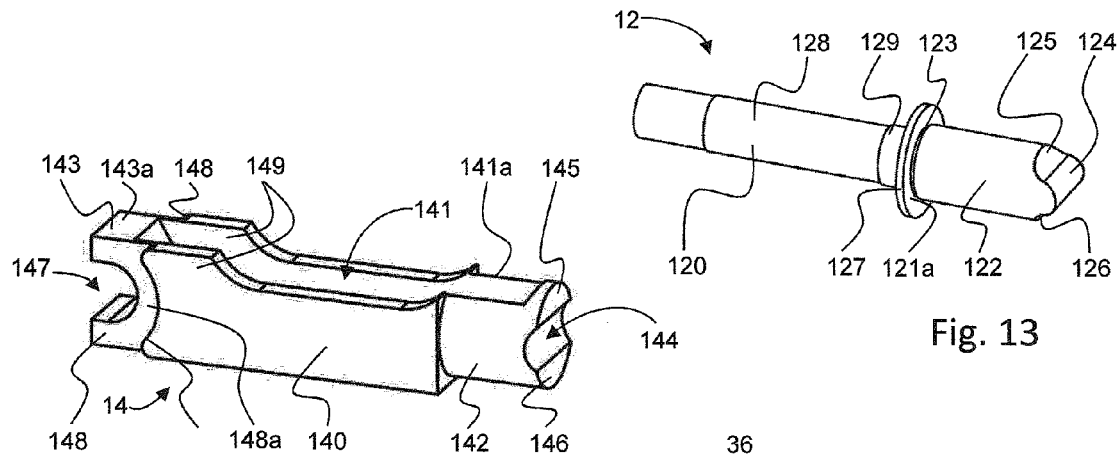
Fig. 13
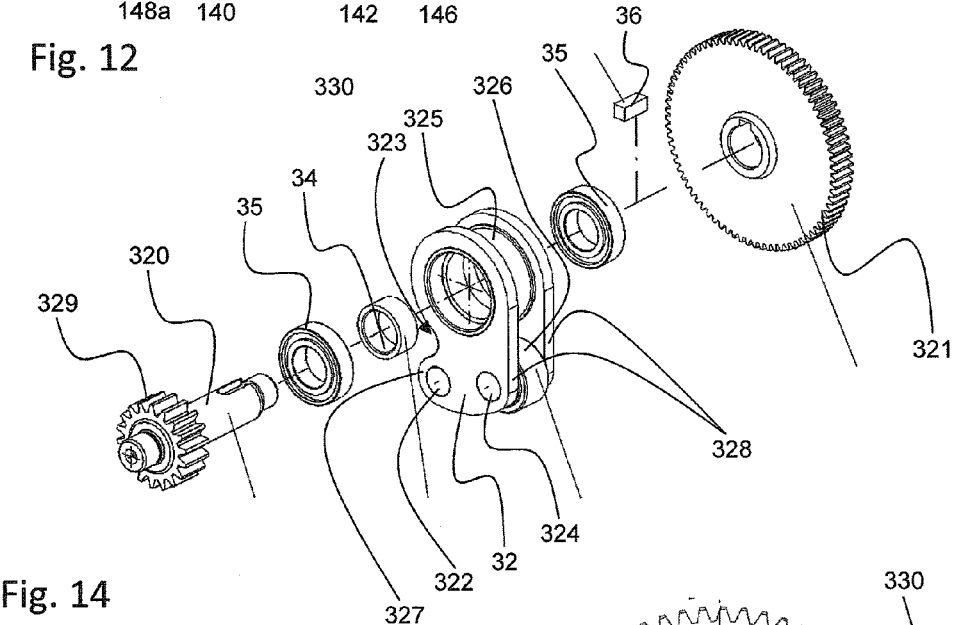
Fig. 12
Fig. 14
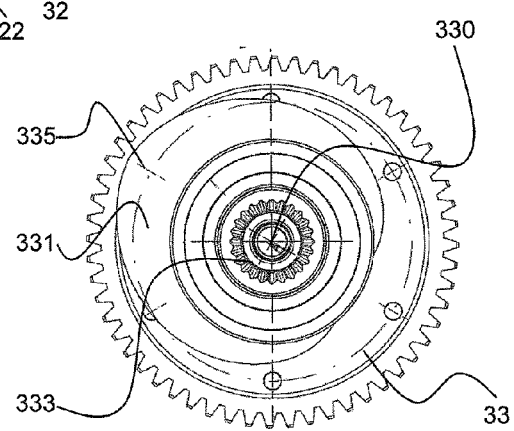
Fig. 15

ROTARY-LEAF/-CASEMENT DRIVE

TECHNICAL FIELD

The present invention relates to a rotary drive for a leaf/casement, in particular a door, a window or the like, according to the preamble of claim 1.

PRIOR ART

Door drives are used in a widespread manner in order to actuate door leaves (or casements such as windows or the like). The drive is fastened to the door frame, to the door lintel or an adjacent wall and acts on the door leaf via a linkage. In principle, the door drive can also be mounted on the door leaf and can actuate the door leaf with respect to the aforementioned elements. Here, the term "actuate" may mean either opening or closing the door or both.

Here, the door drive can be driven at least temporarily by an energy store (compression spring or hydraulic means). If the door leaf is actuated by a user from a starting position (for example door closed) into an end position (for example door open), the energy store can thus take up energy (for example via a compression spring) and store said energy temporarily in order to then release this energy again to actuate the door leaf back from the end position into the starting position. To this end, rotary-leaf/-casement drives typically have an eccentric cam disk, which is arranged on an output shaft for conjoint rotation therewith and which has an end-face rolling surface. The energy store can exert a torque on the output shaft via a rolling cam-follower roller pressed onto this rolling surface on account of an operative connection to the energy store. Here, the shape of the rolling surface (in particular the distance thereof from an axis of rotation of the drive shaft) determines the course of this torque during an actuation of the door leaf. The cam-follower roller is thus mounted such that it can move toward the eccentric cam disk and away therefrom.

An automatic door drive may comprise, for the automatic actuation of the door leaf by means of a controller, a drive acting electromechanically or electrohydraulically on the output shaft via a gear mechanism.

The automatic door drive can be provided with an energy store, such that the drive for example actuates the door leaf and the energy store then allows the door leaf to perform the reverse movement at least in part.

Door drives which automatically open the door, for example via a movement detector, and then initiate the closing process in a time-delayed manner are known. So as to be able to reliably close a (fire) door in case of emergency (for example in the event of a fire in a building), even with interrupted power supply, the closing movement of the door drive is often effected by an autonomously functioning energy store (for example a mechanical energy store).

Since a larger building generally requires a multiplicity of such automatic door drives with energy store, it is important that these can be provided reliably and in a compact and cost-effective manner. An advantageous embodiment of the operative connection between the energy store and output shaft and between the automatic drive via the gear mechanism and the output shaft is central for this objective.

DISCLOSURE OF THE INVENTION

One object of the present invention is therefore to provide an improved motor-automated rotary-leaf/-casement drive with an energy-store module, which ensures a reliable closure of the leaf/casement, in particular of a door, a window or the like, by means of the energy-store module in the event of a mains failure or a fire alarm, and at the same time is compact and space-saving.

This object and other objects are achieved in accordance with the invention in accordance with the features specified in claim 1. The objects are thus achieved by a rotary drive for at least one leaf/casement, in particular a door or a window, comprising: at least one output shaft for coupling to the at least one leaf/casement; at least one motor, which acts on the output shaft via at least one downstream gear mechanism; an energy-store module, which has a linear line of action and uses transmission elements (preferably rigid transmission elements) to apply pressure to the circumference of an eccentric cam disk or cam disk arranged on the output shaft for conjoint rotation therewith; and an intermediate shaft, which is offset in relation to the line of action of the energy-store module and is provided (in relation to the line of action of the energy-store module) between the motor and output shaft in that the transmission elements comprise a roller lever, which is mounted rotatably on the intermediate shaft and has a cam-follower roller spaced apart from the intermediate shaft, wherein the cam-follower roller, pressed circumferentially against the eccentric cam disk, interacts with the output shaft, and the energy-store module is arranged on the motor side in relation to the intermediate shaft.

The term "circumferentially" here means the lateral surface of the eccentric cam disk, and the term "linear line of action" means that the energy-store module does not change a direction of energy in which it performs work.

The transmission elements (in the gear mechanism housing) are rigid elements, which transmit forces under the action of pressure (and not under the action tensile load). Here, these transmission elements are to transmit in particular the linear movement of the energy-store module into a torque acting on the output shaft, that is to say a rotary movement, and are to transmit a rotary movement of the output shaft into a linear movement of the energy-store module. Unwanted shear forces in the energy-store module are therefore also to be avoided.

Here, the motor is not to act directly on the energy-store module, but is to act on the energy-store module via the output shaft and the eccentric cam disk fitted thereon for conjoint rotation therewith. A torque curve between the output shaft and energy-store module is then predefined via the eccentric cam disk shape. The eccentric cam disk may have a symmetrical or asymmetrical cross-sectional shape, as viewed in the direction of a longitudinal extension of the output shaft of the rotary-leaf/-casement drive, that is to say circumferentially, depending on requirements, and it is possible here due to the relative arrangement of the eccentric cam disk on the output shaft to use the energy stored in the energy-store module to close (for example fire doors) or open (flue doors) the corresponding leaf/casement.

So that left and also right doors can be operated with the same eccentric cam disk and so that it is also advantageous with a possible pendulum operation, the eccentric cam disk preferably has a symmetrical design.

The fact that the energy-store module is arranged "on the motor side in relation to the intermediate shaft" is to be understood such that the intermediate shaft follows the output shaft spatially in relation to the line of action of the energy-store module, and the motor and the energy-store module then follow spatially downstream (that is to say after the intermediate shaft as viewed from the output shaft) in relation to the line of action. Here, a gear mechanism (which preferably actively incorporates the intermediate shaft) can preferably be arranged between the output shaft and motor for the transmission of the motor drive effect to the output shaft.

Instead of the cam-follower roller, another pressing member can also be used for the contact with the eccentric cam disk and then slides instead of rolls, for example. In particular, the pressing member or the cam-follower roller is to be able to move toward the eccentric cam disk and away therefrom.

The energy store may alternatively also be referred to as an energy storage device.

By way of example, an electromechanical or electrohydraulic motor with an output for example from 50 to 500 watt, in particular of approximately 100 watt, can be used as a motor. A person skilled in the art will decide what type of motor is to be selected on the basis of the requirements imposed by the actuation of the corresponding leaf/casement.

Here, the line of action of the energy-store module is preferably arranged offset in relation to the drive shaft. Here, it is advantageous when the output shaft and the intermediate shaft run parallel to one another and perpendicularly to the line of action of the energy-store module and/or are arranged on the same side of the line of action.

The transmission elements preferably further comprise a rigid pendulum piece, which extends between the roller lever and the energy-store module and is preferably coupled in an axle-free manner to the roller lever and to the energy-store module. This pendulum piece is arranged on the one hand at least partially in the direction of action of the energy-store module and on the other hand in the sphere of action of the roller lever. The pendulum piece is thus coupled on either side and converts the linear movement of the energy-store module into the circular movement of the roller lever around the intermediate shaft and vice versa.

For coupling to the energy-store module and roller lever, the pendulum piece preferably has a circular cylindrical or spherical overlap with the respective receptacle of a corresponding engagement element (of a partial circular cylinder or a partial sphere) of the roller lever and of the energy-store module.

The intermediate shaft is an axis of rotation for the roller lever. The intermediate shaft is also preferably an intermediate shaft of the gear mechanism and is offset in relation thereto, as viewed in the direction of the line of action of the energy-store module, and is arranged between the output shaft and the point at which the energy-store module is coupled to the pendulum piece, wherein the pendulum piece preferably has a recess for the engagement of elements of the gear mechanism, and wherein the intermediate shaft is preferably further distanced perpendicularly from the line of action of the energy-store module than the output shaft.

In order to enable the most compact design possible, the roller lever preferably does not cross the axis of the output shaft in any position.

In particular, the roller lever may be a one-armed lever, wherein the cam-follower roller is offset in the direction transverse to the direction of action of the energy-store module preferably between the intermediate shaft and the point at which the pendulum piece is coupled to the roller lever and is preferably offset with respect to the drive shaft, and is preferably arranged beneath the drive shaft in relation to the direction transverse to the line of action of the energy-store module (that is to say between the drive shaft and the line of action in relation to this direction).

A possible gear mechanism may preferably provide a transmission from motor side to output side toward higher forces. In addition, this gear mechanism can preferably be housed in a gear mechanism housing, wherein this gear mechanism housing also receives the transmission element, that is to say in particular also the pendulum piece, and ensures the mounting of the shafts. It is then preferable for the motor and the energy-store module to be fitted to the gear mechanism housing from the same side, preferably parallel in relation to the longitudinal extension thereof and offset vertically (that is to say in the height direction) and to engage with said gear mechanism housing.

An arrangement of the intermediate shaft and a length of the roller lever in such a way that the pendulum piece swings via the roller lever-side end thereof from the line of action of the energy-store module toward the output shaft, whereas the ram-side end remains in the line of action of the energy-store module, is preferred.

A spring energy-store module is preferred as energy-store module, wherein a compression spring in particular is provided therein, wherein the compression spring is preferably pre-stressed between a spring flange and a guide flange, wherein connecting rods extending preferably externally on the spring connect the spring flange and the guide flange and thus form the spring energy module, which can be arranged on the gear mechanism housing, on which the motor is also arranged from the same side.

"Linear line of action" of the spring energy-store module is then to be understood such that the spring energy is always guided in the same direction (the line of action), that is to say the direction of force in which the spring module provides the force for performing work is not dependent on the spring stress.

It is also advantageous when a possibility to adjust the pre-stress of the spring of the spring energy store is provided. An adjusting screw passing through the spring flange with threaded engagement is particularly preferably provided and acts on a spring pressure piece between the spring flange and resting on the end face on the (compression) spring, whereby a pre-stress of the compression spring can be adjusted by turning the adjusting screw.

A spring plunger is preferably provided in the energy-store module on the other end face of the spring, that is to say opposite the spring pressure piece, and engages with the gear-mechanism housing in a manner guided in a linear movement through a guide in the guide flange, by means of which the energy-store module is preferably flange-mounted to the gear-mechanism housing and is coupled to the pendulum piece by means of a press lug.

Here, the guide and the guided portion of the plunger are preferably of complementary circular-cylindrical shape, such that the plunger can be guided without hindrance in the guide in the longitudinal direction. However, it is also conceivable here for this cross-sectional shape to be elliptical, quadrangular or polygonal, such that the spring plunger is also guided in relation to the radial orientation thereof through the guide (that is to say the plunger does not perform any rotation about the longitudinal axis thereof during the linear movement). The portion of the pendulum piece then engaging possibly from the other side with the guide has to be formed likewise so as to fit in the guide.

In principle, a transmission of force by the compression spring via spring plunger and pendulum piece to the roller lever thus takes place, wherein the roller lever transmits the force to a preferably symmetrical eccentric cam disk and thus transmits energy from the mechanical energy storage device (energy store) to the output shaft.

A preferably adjustable energy storage device is preferably given by means of a compression spring and an adjusting screw.

The force transmission from and to compression spring is preferably transmitted linearly by means of the spring plunger. The linear force is transmitted with the pendulum piece ideally to the roller lever, wherein the roller lever is preferably pivotably mounted on the intermediate shaft in such a way that neither the gear mechanism nor the gear mechanism housing is additionally loaded. The resultant forces are transmitted from the pendulum piece via the roller lever to the eccentric cam disk and thus to the output shaft. The roller lever is preferably mounted upstream of the output shaft, that is to say the roller lever does not cross the axis of the output shaft in any position. An ideal packing density of the gear mechanism is thus achieved. The linear force of the compression spring is preferably converted into a variable torque curve.

In principle, the drive system can also be operated without mechanical (or hydraulic) energy storage device (that is to say also without energy-store module). This allows the use of the gear mechanism also in purely electrically operated rotary-leaf/-casement drives.

In addition, the embodiment of the energy storage device system may allow a torque effect at the output drive to be inverted, whereby drive systems can be produced which can open mechanically automatically as required (for example flue doors). This is achieved in that the rolling start point of the cam-follower roller is at the other end of the eccentric cam disk.

The rotary-leaf/-casement drive preferably has a universal interface (housing flange for the motor) between the motor and the housing. A universal flange can also be provided on the gear mechanism housing, such that this rotary-leaf/-casement drive can be operated with different motors with different motor sizes or power classes. Due to the formation of the end-face fastening bores on the housing flange in the form of slots, an advantageous universality is achieved with respect to the fastening of different motor sizes.

The rotary transducer is located on the screw gear shaft. The rotary transducer base (including circuit board) is screwed to the housing two screws. The rotary transducer is pressed easily onto the end of the screw gear shaft. This type of assembly allows an easy exchange of the rotary transducer where necessary.

It is known that the leaf/casement to be actuated via the drive is connected to the output shaft by means of a toggle linkage, a cross bar linkage or another linkage via a linkage connection on the output shaft. However, there are a large number of different leaves/casements which each has to perform different actuation movements depending on local conditions (for example different angle of aperture).

A further object of the present invention is therefore to provide an improved coupling of motor and/or energy-store module via the output shaft to the actuated leaf/casement.

This object and further objects are achieved by a rotary drive with an output shaft for coupling to a leaf/casement and comprising a chassis, in particular as described above, in that a preferably substantially cylindrical clamping piece extending along a longitudinal direction of the output shaft is provided, wherein the clamping piece, in the longitudinal direction, comprises an engagement portion for rotationally fixed and preferably form-fitting engagement with a linkage connection of the output shaft and a connection portion for connection to a linkage, wherein the clamping piece further comprises a stop finger protruding substantially at right angles to the longitudinal direction, wherein the stop finger is formed in such a way that it at least partially describes an effective circle around the clamping piece as the output shaft rotates, and wherein a stop element protruding into this effective circle and cooperating with the stop finger is provided on the chassis in a detachably fastened manner, wherein the stop element is eccentrically mounted and provides a stop face for the stop finger, wherein the stop element, once the fastening has been released, can be rotated and fastened again in such a way that the stop face moves circumferentially over the effective circle, preferably continuously.

Here, the clamping piece is provided as a mating piece to the linkage connection of the output shaft in order to transmit the torque from the output shaft to the linkage for actuation of the leaf/casement. This clamping piece advantageously has a substantially cylindrical main body, wherein a cylinder axis of this main body (in the longitudinal direction) advantageously runs identically to the axis of rotation of the output shaft when the clamping piece is inserted into the linkage connection. Said main body extends along this axis from an engagement portion for engagement with the linkage connection to a connection portion for connection to the linkage. Here, the engagement portion is advantageously formed in a manner complementary to the linkage connection (for example forming a (conical) spline).

The fact that the engagement portion is formed in a manner complementary to the linkage connection is to be understood generally such that the engagement portion and the linkage connection are formed in such a way that the two elements can engage with one another and the clamping piece can be fastened in the linkage connection for conjoint rotation therewith in relation to a rotation about the axis of the output shaft. This can occur by means of a force fit (for example by clamping, which may be advantageous since the clamping piece can then be fastened against the linkage connection, for example rotated continuously). However, it is preferable to establish the connection additionally or alternatively by means of a form fit, for example by means of a detent mechanism in the linkage connection and a corresponding detent mechanism on the engagement portion. However, another force- and/or form-fitting connection known to a person skilled in the art, such as Hirth toothing or another tooth or polygon connection or a plug connection for connection of the clamping piece to the output shaft, can also be used. In principle, the output shaft may also have a conical engagement element as described herein, and the clamping piece may have a recess formed in a manner complementary thereto.

However, the linkage connection here is preferably an indentation arranged radially symmetrically about the axis of the output shaft and tapering conically from the outside in. The linkage connection, on the lateral surface thereof directed inwardly toward the axis of the output shaft, for example has 12 to 60, in particular 24 teeth running from the inside out (these teeth form the detent mechanism) distributed uniformly over the circumference. The teeth are preferably combs, which run on the lateral surface of the linkage connection in a straight line from the outside in and toward the axis of the drive shaft.

The engagement portion is then a conical end region of the cylindrical clamping piece and is formed in a manner complementary to linkage connection for form-fitting engagement (conical spline) therewith. Combs running in the direction of the cylinder axis for engagement with the toothing of the linkage connection are thus provided on the lateral surface of the cone.

If such a spline for connection of clamping piece and output shaft is used, a majority of teeth of the linkage connection are then always meshed with form-fitting engagement with teeth of the engagement portion, whereby an ideal torque transmission from the output shaft to the clamping piece and further to the linkage is guaranteed.

The linkage and the clamping piece are fixed and clamped respectively to the output shaft by a screw. The linkage and the clamping piece have a corresponding large bore parallel to the cylinder axis of the main body for the passage of the screw. Since the torque is transmitted in a form-fitting manner (conical spline) from the output shaft to the clamping piece and further to the linkage, and the screw only clamps the elements, the screw is ideally also only subject to tensile load.

The clamping piece may have a rotationally fixed lever protruding preferably substantially on one side laterally from the main body. Additionally, a stop element may then preferably be provided on the chassis of the drive, said stop element cooperating with the lever in such a way that the rotary movement of the output shaft is stopped when the lever contacts the stop element. The maximum angle of aperture of the leaf/casement can be determined by means of the lever and the stop element.

The lever can be clamped on the main body of the clamping piece, plugged into individual recesses preferably arranged circumferentially around the main body, or fitted on the body for conjoint rotation therewith via a toothing, or can be formed integrally on the main body.

The lever advantageously surrounds the main body (similarly to a clamping sleeve) and is fastened on the main body for conjoint rotation therewith with a form fit via a spline. To this end, the lever provides a recess, through which the main body can be inserted in the direction of the cylinder axis thereof. This recess may then provide a toothing peripherally, and the main body can provide a corresponding toothing fitted circumferentially on the main body, wherein these toothings then together form the spine. This spline can be produced for example by a meshing of in each case 15 to 60, in particular 35 teeth distributed circumferentially, preferably uniformly. The lever arm or stop finger for contacting the stop element may then protrude laterally from the main body over a limited angular range (for example an azimuth angle from 5 to 60 degrees) and describes an effective circle as the output shaft rotates. Due to the multiplicity of teeth of the spline, the angular range via which the stop finger protrudes beyond the circumference of the main body can be selected depending on the number of teeth (for example in steps of 12 degrees with 30 teeth each).

The stop element can then be fitted as a substantially disk-shaped element (that is to say as a cylinder) at least partially in the effective circle of the lever arm rotating about the axis of the output shaft. Here, the stop element may preferably have an eccentric fastening, for example can be fastened directly or indirectly to the chassis by a screw perpendicularly to the effective circle of the lever arm. The screw is guided through a non-central bore in the stop element. When the screw is loosened, the stop element is rotatable about this screw, wherein the stop point of the lever can be steplessly adjusted on the disk by the eccentric fastening of the screw circumferentially on the effective circle of the stop finger by rotation of the stop element. This fine adjustment then completes the possibility for adjusting a possible spline between main body and lever as described above.

However, the lever may also be clamped on the main body with a form fit (that is to say without toothing) in principle, which allows a continuous adjustment between lever and clamping element.

The lever is advantageously located between the engagement portion and the connection portion. However, it is also conceivable for the portion of the main body to which the lever is fastened to be connected to the connection portion of the main body.

For the mounting of the stop element, a stop support is provided, which is preferably screwed parallel to the drive housing from above onto the chassis. At the end face, that is to say laterally in relation to the rotary drive, the eccentrically adjustable cylinder (the stop element), as described above, is screwed by means of a screw onto the stop support. A toothing, to which a stop finger can be attached, is located circumferentially on the clamping piece. As soon as the door, leaf/casement or the like is opened beyond a certain angle, the stop finger contacts the adjustable cylinder and the opening is limited. Since a damping mechanism is located beneath the cylinder, the drive module is additionally preserved. Due to the fastening of the stop on the chassis, the drive housing is not loaded per se, that is to say the resultant forces at the stop are diverted to the chassis.

It is conceivable for the clamping piece according to the invention to be used with the lever and for the stop element according to the invention to be used with a rotary drive with conventional gear mechanism.

A tactile switch is preferably fitted in the gear mechanism in order to be able to reference the system at any time. This switch may preferably cooperate with a switching ring or switching ring on a shaft, in particular a switching ring on the output shaft, and may thus identify the rotary position of the corresponding shaft. Due to the provision of the corresponding switching ring on the output shaft, all door arrangements (independently of the linkage systems) can be referenced cleanly using the same system.

BRIEF DESCRIPTION OF THE DRAWINGS

Preferred embodiments of the invention will be described hereinafter on the basis of the drawings, which serve merely for explanation and are not to be interpreted as limiting. In the drawings:

FIG. 8 shows a lateral three-dimensional view of the drive module according to FIG. 4 from the rear from above without gear mechanism housing, but with large intermediate gear;

FIG. 9 shows a lateral three-dimensional view of the drive module according to FIG. 8 from the front from above;

FIG. 10 shows a lateral three-dimensional view of the drive module according to FIG. 8 from the front from below;

FIG. 11 shows an enlarged detail of the gear mechanism according to the invention according to FIG. 8 without large intermediate gear from a side from the front;

FIG. 12 shows a pendulum piece according to the invention of the gear mechanism according to FIG. 8;

FIG. 13 shows a plunger according to the invention according to FIG. 8;

FIG. 14 shows an exploded illustration of the intermediate shaft of the gear mechanism according to FIG. 8;

FIG. 15 shows a side view of an output shaft of the gear mechanism according to the invention according to FIG. 8;

DESCRIPTION OF PREFERRED EMBODIMENTS

Figure 1:
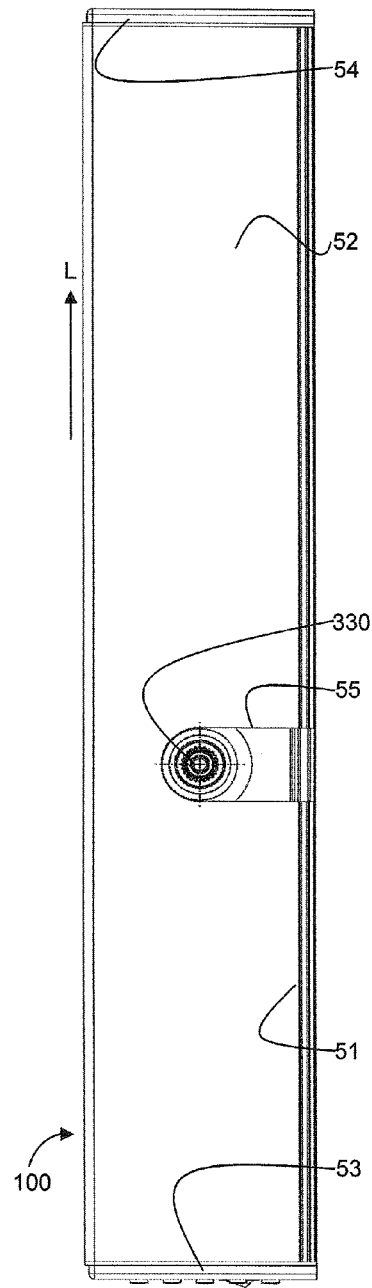
FIG. 1 shows a front side view of a rotary-leaf/-casement drive according to the invention.

A rotary-leaf/-casement drive 100 according to the present invention is illustrated in FIG. 1. Side elements 53, 54 are provided at the short end sides on a mounting plate 51 or chassis 51 extending in a longitudinal direction L (from left to right in FIGS. 1-4, 6, 7 and 9-11). A U-shaped cover or casing 52 extending along the chassis 51 can be slid over side covers 53, 54 and is guided by the side covers 53, 54 when fitted and rests thereagainst in the longitudinal direction L in the covering position. Here, the chassis 51 and casing 52 are preferably produced from metal and are preferably each produced integrally. Here, a substantially closed box is provided, wherein the casing 52 has a recess 55, formed centrally in the side faces, in the region of an output shaft 330 of the rotary-leaf/-casement drive 100. This recess 55 can be seen in FIG. 1 on the front side, but can additionally or alternatively also be provided on the rear side, depending on requirements. When reference is made hereinafter to a "shaft", an axis of the shaft is thus intended at most, depending on the context.

Figure 2:
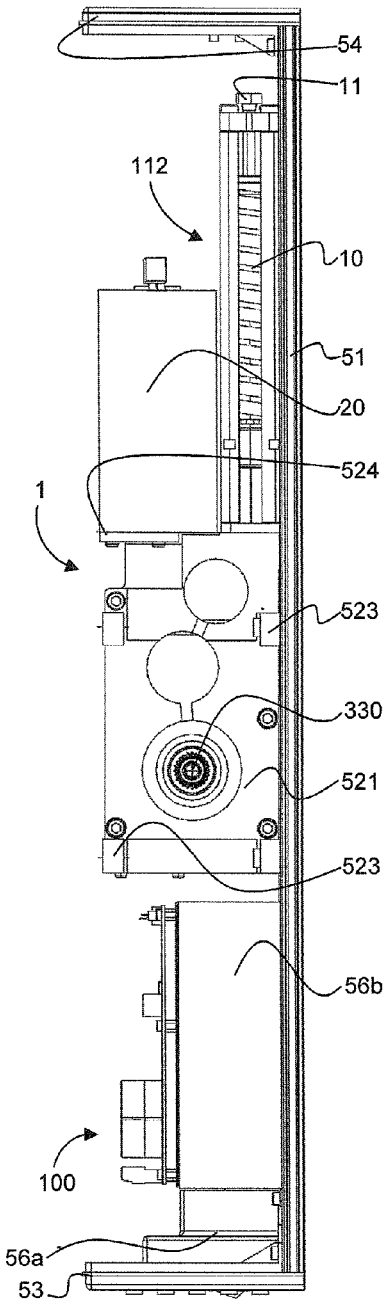
FIG. 2 shows a front side view of the rotary-leaf/-casement drive according to FIG. 1 without casing.
Figure 3:
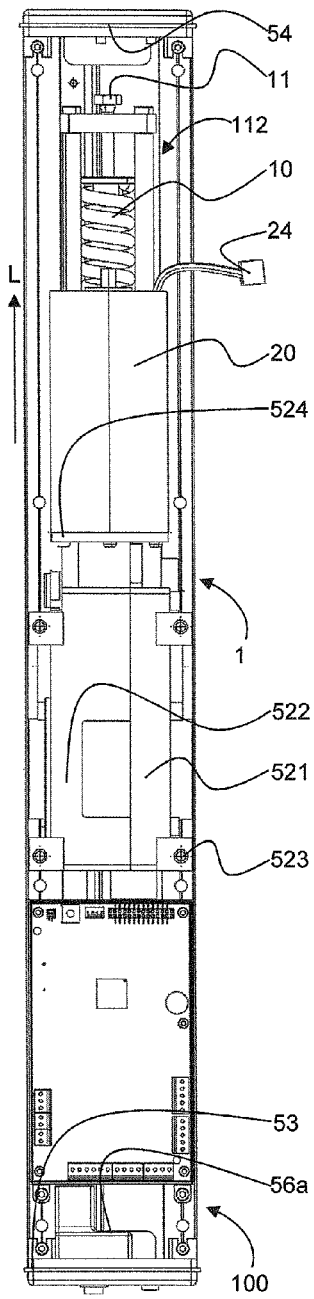
FIG. 3 shows a view from above of the rotary-leaf/-casement drive according to FIG. 2.

In FIG. 2, the rotary-leaf/-casement drive 100 is illustrated from the side without casing 52; a corresponding view from above is illustrated in FIG. 3. It is clear from FIGS. 2 and 3 that the following are arranged adjacently on the chassis 51 in the L-direction and between the left side cover 53 to the right side cover 54 (in the box, where the casing is mounted): (in the first third in relation to L from the left) a mains connection 56a with a controller 56b and subsequently a drive module 1.

The drive module 1 extends substantially from the controller 56b to the right side cover 54 (from a gear mechanism housing 521, 522 to the motor 20 and to the energy-store module 112 arranged parallel to and beneath the motor 20). The left side cover 53 additionally provides feedthroughs in the rotary-leaf/-casement drive 100 (for example for power lines to the mains connection 56a and/or data lines or other connections to the electronics or other components) and, if need be, operating elements (switches, buttons, touchscreen) or information elements (lamps, LEDs display).

It can additionally be seen in FIG. 2 that the drive module 1 adjoins the controller 56b with the gear mechanism housing 521, 522 in the L-direction. The gear mechanism housing 521, 522 surrounds a transmission gear mechanism 30 (see below) of the drive module 1 and consists of a first housing shell 521 and a second housing shell 522, which are joined together from a direction transverse to L and parallel to the chassis 51 to form a box substantially filling the U-profile of the cover 52 in cross section. A motor 20 extending along L engages with an upper region of the gear mechanism housing from the right in FIG. 2. The motor can be actuated via a connection cable 24 by the controller 56b and can be fastened to the housing 521, 522 via a preferably universal flange 524. A spring energy module 112 extending along the chassis 51 is provided parallel to and centrally beneath the motor 20 on the chassis 51 and likewise engages with the gear mechanism housing 521, 522.

Figure 4:
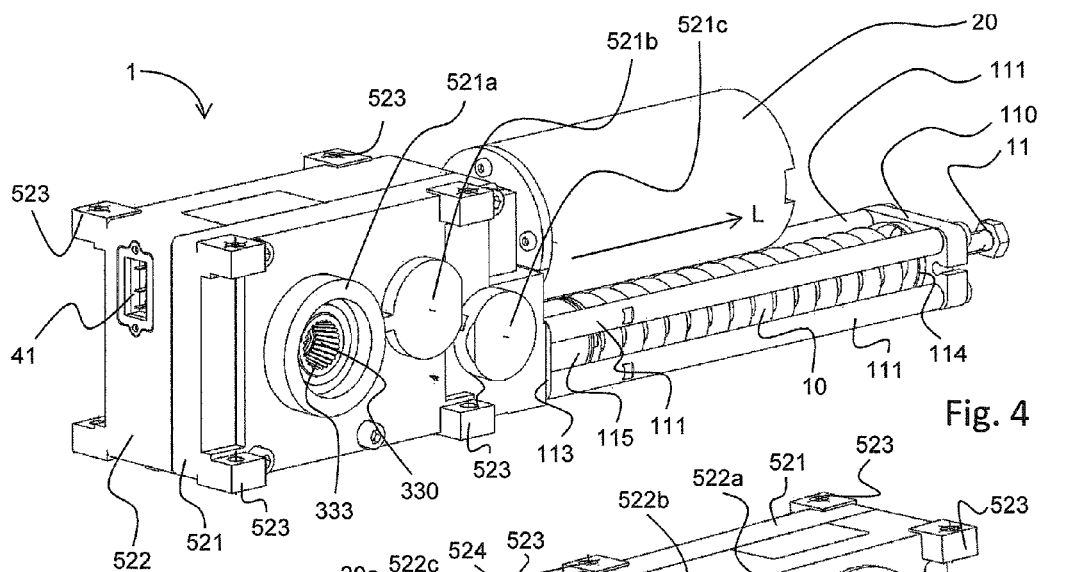
FIG. 4 shows a front three-dimensional view from the upper left of an embodiment of a drive module according to the invention (according to FIGS. 2 and 3) with gear mechanism housing.

The drive module 1 according to the invention is shown in FIG. 4 in a lateral three-dimensional view from the front from the upper left. The two housing halves 521, 522 can be seen. In addition, round protrusions 521a-c, 522a-b (see also FIG. 5) can be seen on the lateral (as considered from the view according to FIG. 2) outer face and, on the opposite side of the same housing halves 521, 522, that is to say internally in the gear mechanism housing 521, 522, form indentations for receiving components (for example bearings of the shafts 310, 320, 330, see below) of the gear mechanism 30. An indentation 522c for a rotary transducer at the height of the first shaft 310 is additionally provided on the outer second housing shell 522, which has an aperture for the passage of the first shaft 310, which is adjoined by the rotary transducer 53 and provides data concerning the rotary position of the first shaft 310. A gear mechanism 30 with three axes is also installed; each of the three axes runs behind a respective one of each of the protrusions. Here, the protrusion 521a, 522a is advanced into the gearbox housing interior and thus makes it possible, via an engagement element, to tap torque from the output shaft 330 (the third axis beside a screw gear shaft 310 and an intermediate shaft 320 arranged centrally between the output shaft 330 and the screw gear shaft 310, see below) via a latched linkage connection 333.

The linkage connection 333 (see also FIG. 15) is an indentation arranged radially symmetrically about the output shaft 330 (approximately 1 to 2 cm deep), said indentation running in a manner widening conically from the inside out (outer diameter approximately 1.8 cm, inner diameter at the depth approximately 1.3 cm). The indentation has 24 teeth running from the inside out distributed uniformly over the lateral surface of said indentation (alternatively, 12 to 60 or more teeth may also be provided) with radial height of 1-2 mm (see FIG. 4). The teeth are combs which run on the lateral surface of the linkage connection 333 in a straight line from the outside in and toward the axis of the drive shaft 330.

Figure 5:
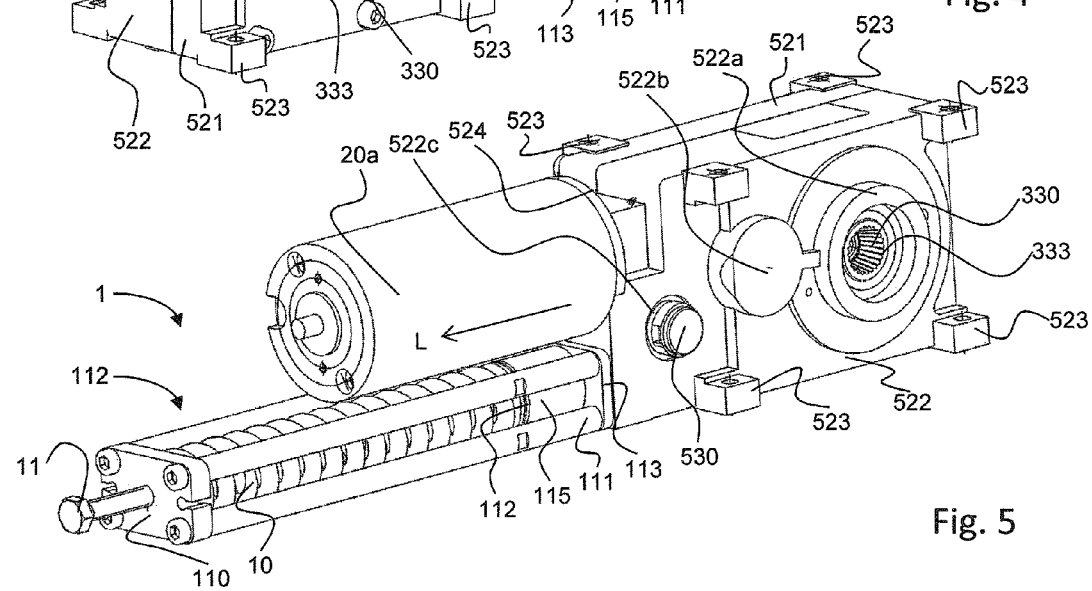
FIG. 5 shows a rear three-dimensional view from the upper right of the embodiment according to FIG. 4.

In this context, reference is now also made to FIG. 5, which shows the subject matter according to FIG. 4 from above and from behind. There, it can be seen that a recess 522a for engagement with a further linkage connection 333 arranged mirror-symmetrically relative to the output shaft 330 is also arranged on the rear side of the housing (that is to say in the housing shell 522).

Due to the detent mechanism of the linkage connection 333 (that is to say by the teeth or combs) according to FIGS. 4 and 5, an adjustment of the linkage (not illustrated in the figures) coupled to the leaf/casement is possible.

Lateral protrusions 523 are provided at the corners of the box formed by the shells 521, 522 as means for fastening the box 521, 522 on the chassis 51 and possibly for the casing 52. Vertically running holes through these fastening means 523 allow screws, rivets or similar means to be received, which can then be screwed or fastened on the chassis 51 or casing 52.

A socket 41 is formed on the left end side of the box 521, 522, via which socket an electric (tactile) switch 40 (see FIG. 11) fitted in the gear mechanism 30 can be contacted.

A cylindrical body 20a of the motor 20 can also be seen in FIGS. 4 and 5. A cylinder axis of this motor body 20a (and therefore also a motor shaft 21, see FIG. 11) runs parallel to the direction L and advances in the upper third of the height of the shells 521, 522 through an opening in the rear shell 522 in the gear mechanism housing 521, 522 for operative connection with the gear mechanism 30, whereas the motor body 20a is screwed on a housing flange 524 provided around this opening. Due to a universal interface between the motor 20 and housing 521, 522, motors of a wide range of motor sizes and/or different power classes can be used.

Furthermore, the spring module 112 can be seen in FIGS. 4 and 5. The spring module 112 extends from the gear mechanism housing 521, 522 toward the right side cover 54 and rests flat against the housing 521, 522 beneath the motor body 20a via a guide flange 113. The module 112 comprises the guide flange 113, a spring flange 110, connecting rods 111, a spring 10, a spring plunger 12 and a spring pressure piece 114.

The four connecting rods 111 are fixed into the corners on the substantially rectangular guide flange 113 extending in a planar manner via the longitudinal side thereof transversely over the width of the housing 521, 522 and extend in the direction L as far as the spring flange 110. At the end sides thereof directed toward the guide flange 113, the connecting rods 111 have a threaded bolt for fastening to the housing 521, 522. The guide flange 113 has corresponding through-holes for the connecting rods. The guide flange 113 is thus clamped by the connecting rods 111. In addition, a preferably circular cylindrical guide 115 is fitted centrally and in a planar manner on the guide flange 113 and protrudes from the guide flange 113 by approximately 3 centimeters between the connecting rods 111. The guide 115 is a hollow cylinder (outer diameter approximately 3 centimeters) with a circular cylindrical cavity (or a through-hole) of approximately 2.3 centimeters diameter passing through the entire guide flange 113.

Threaded holes (for example M6) are provided at the end side on the free end portions of the four connecting rods 111 of identical length, via which threaded holes the plate-shaped spring flange 110 (also measuring approximately 3 centimeters to approximately 5 centimeters) can be screwed on externally. A helical spring or coil spring 10 is provided between the connecting bolts 111 and extends from the guide flange 113 in the direction L to the spring flange 110 and is tensioned therebetween. The spring 10 is the active element of the energy-store module 112 and is designed such that it provides up to 5 kilonewtons of spring energy in order to apply pressure to an eccentric cam disk 331 (see below and FIGS. 10 and 11).

The compression spring 10 is provided at a right end portion toward the spring flange 110 with the spring pressure piece 114. The spring pressure piece 114 rests at the end side from the right on the compression spring 10 as a plate or disk approximately 4 millimeters thick and covers the compression spring at the end (in relation to L) substantially preferably in a flush manner. For improved guidance, a preferably circular cylindrical portion (diameter approximately 16 millimeters) optionally protrudes centrally and in a planar manner into the hollow compression spring 10 by approximately 1 centimeter. In order to be able to receive the adjusting screw 11, the spring pressure piece 114 has a cylindrical recess in the form of a blind bore. Here, this cylindrical portion (together with the spring pressure piece plate) of the spring pressure piece 114 preferably provides a recess approximately 1 centimeter deep (preferably centrally in relation to a coiled spring cross section) for a bolt of an adjusting screw 11. This recess is a blind bore (approximately 8 millimeters in diameter) approximately 1 centimeter deep, which passes through the spring compression piece disk into the cylindrical portion. Here, the adjusting screw 11 is to be guided laterally without threaded engagement through this recess, which is preferably circular in cross section, and is to press on the spring pressure piece 114 when at the depth of the blind bore and is to press on the spring pressure piece 114 against the force of the compression spring 10.

The adjusting screw 11 passes through the spring flange 110 here with threaded engagement (for example M8) from the outside, contacts the spring pressure piece 114 internally and is received by the recess in the spring pressure piece 114 as described above. If the adjusting screw 11 is screwed by means of the threaded engagement so as to project deeper in the spring flange 110, the adjusting screw 11 passes through said spring flange 110 increasingly deeper and presses the spring compression piece 114 onto the compression spring 10. The spring pre-stress thus increases. Such an adjustment leaves the torque curve (shape thereof) substantially unchanged. Merely the size (the value) of the torque is changed in a substantially constant ratio.

The compression spring 10 is provided at the other end portion (the left end portion) toward the guide flange 113 with a spring plunger 12. The spring plunger will now be explained on the basis of FIG. 13 and FIGS. 6-11. The plunger is to strike or be pushed with a force up to 5 kilonewtons and is preferably manufactured from hardened steel (similarly to the pendulum piece 14, see below).

FIG. 13 shows the spring plunger 12 in three-dimensional view from the side. The plunger body 120 is cylindrical, preferably circular cylindrical, and extends from a head portion 122 (with a diameter of approximately 2 centimeters and a length of approximately 4 centimeters) to a guide portion 128 (with a diameter of approximately 1.5 centimeters and a length of approximately 8 centimeters). A disk-shaped spring stop 127 approximately 2 millimeters thick and with a diameter of approximately 3 centimeters is arranged centrally between the head portion 122 and the guide portion 128. A ring protruding beyond the plunger body 120 by approximately 5 millimeters with annular stop faces 121a, 121b (ring faces) arranged perpendicularly to the longitudinal extension of the plunger 12 is thus created. The guide portion 128 is introduced into the cavity of the compression spring 10. To this end, the guide portion can be provided in the free end region with a plastic sleeve for guidance in the spring. The guide portion 128 widens over a length over approximately 1 centimeter to a diameter of 16 millimeters toward the stop face 121b on the guide portion side. This widening ensures that the resilient end portion is clamped on the widened guide portion 129 directly beside the stop face 121b. Corresponding sleeves for clamping the plunger 12 can be additionally or alternatively slid over the guide portion 128 thereof. From the stop face 121a on the head portion side, the head portion 122 passes via a minimum undercut 123 (1 millimeter wide and deep) to a press lug 124 running transversely to the plunger direction and bordered on either side by a recess 125, 125 in the form of a partial circular cylinder (cross-sectional shape is therefore a segment or sector of a circle) of approximately 5 millimeters circle diameter. To the front, the press lug 124 is rounded in a circular manner, such that it has the form of a partial circular cylinder (preferably with the cross-sectional shape of a semi-circle) of approximately 5 millimeters circle diameter arranged transversely to the plunder direction (see FIG. 13), and the recesses 125, 126 extend further toward the plunger body (see FIG. 13).

Reverting back to FIGS. 4 and 5. The spring plunger 12 fitted on the left end portion of the compression spring 10 engages via the head portion 122 thereof in the hollow-cylindrical (and preferably circle-symmetrical) guide 115 of the guide flange 113 and thus guides the spring movement linearly, wherein the pendulum piece 14 is in constant contact from the left with the press lug 124 and engages from the left with the guide 115 (wherein the press piece 14 simultaneously pivots upwardly via the left end thereof, such that an angle of up to 3 degrees and open to the left relative to the line of action of the module 112 is created, wherein the pivot point is the press lug 124, see below). When the stop face 121a contacts the end side of the guide 115, the press lug 124 protrudes by approximately 2-4 millimeters beyond the guide flange 113 (toward and into the housing 521, 522). The guide 115 is thus used to guide the plunger 12 until the stop face 121a thereof is contacted.

It is additionally clear on the basis of FIGS. 4 and 5 that a hydraulic or other linearly acting energy store of similar outer dimensions could also be used instead of the spring energy-store module 112 (or spring energy-store module 112). It can also be seen that sufficient space for the installation of different motor types (with different motor bodies 20a) is possible.

It can also be seen in FIG. 5 that a rotary transducer 530 is fitted on the first axis, that is to say the screw gear shaft 310. Due to the arrangement of the rotary transducer 530 on the first stage 310 of the gear mechanism 30, the corresponding shaft end of the motor 20 remains freely available for further applications or functions.

The gear mechanism 30 and cooperation thereof with the motor 20 and the spring energy store 112 will now be described on the basis of FIGS. 6-15.

The motor 20 (for example a 100 watt electric motor) is arranged in the longitudinal direction L and introduces a shrunk-screw 23 approximately 2.4 centimeters long into the housing 521, 522 via the motor shaft 21 approximately 5 centimeters long (and measuring approximately 8 millimeters in diameter). The motor-side end of the screw 23 is distanced from the motor body 20a by approximately 2 centimeters.

The screw 23 engages at an incline (that is to say at a pitch angle) with a screw gear 31 (see FIG. 9). The screw gear 31 (head circle diameter approximately 5 centimeters, foot circle diameter approximately 4 centimeters, thickness approximately 1 centimeter) is mounted on the first stage 310 of the three-stage gear mechanism 30, that is to say the screw gear shaft 310. The screw gear 311 is preferably manufactured from plastic for noise reduction. This is possible since the screw gear is subjected to a lower load than the other gearwheels (the other gearwheels are preferably solid and fabricated from metal, in particular from steel).

The screw gear shaft 310 is located, after mounting, approximately 3.5 centimeters above the chassis 51 and a good 3 centimeters away from the right end face of the housing 251, 252 (see the view in FIG. 4). The first shaft 310 is actuated by the motor 20 via this drive connection. The rotary transducer 53 for reading out the drive function and the rotary position of the first shaft 310 is fitted on the first shaft 310 to the rear (see the view according to FIG. 6), as discussed above. A smaller, thicker (diameter approximately 1.7 centimeters, thickness approximately 2 centimeters) gearwheel 312 adjoins the screw gear shaft 310 at the front (see FIG. 8).

An axis of the second stage of the gear mechanism 30, that is to say of the intermediate shaft 320, is located approximately 4 centimeters lower (as viewed from the right in FIG. 4) in the housing 521, 522 and is placed approximately 18 millimeters higher above the chassis 51 than the axis of the first stage 310. A large intermediate gearwheel 321 (see FIGS. 8-10, 14; not illustrated in FIGS. 6, 7 and 11) is provided on the intermediate shaft 320 to the front and engages with the gearwheel 312, whereby the second stage can then be operated by the motor 20 via the first stage 310. A small intermediate gearwheel 329 (diameter approximately 4 centimeters, thickness approximately 1.2 centimeters) is located to the rear on the intermediate shaft 320 (approximately 3 centimeters behind the rearwardly directed side face of the large intermediate gearwheel 321). A roller lever 32 is mounted therebetween and is provided as a downwardly running single lever.

The third stage of the gear mechanism 30 is the output shaft 330, of which the axis is fastened approximately 5.5 centimeters to the left (in FIG. 11) and approximately 5 millimeters beneath the intermediate shaft 320. The three shafts 310, 320, 330 are mounted in the corresponding, above-described indentations or apertures 521a, 522a, 522c (in each case with corresponding bearings, visible in the figures) assigned to the round protrusions 521a-c, 522a-c on the housing side faces internally in the housing 521, 522. The gear mechanism housing 521, 522 thus forms the receptacle for the gear mechanism 30 and provides the mounting of the shafts 310, 320, 330.

The output shaft 330 can be seen in FIGS. 10 and 11. FIG. 15 shows a side view of the output shaft 330. As can be clearly seen in FIG. 10, the output gearwheel 33 (thickness approximately 1.2 centimeters, diameter approximately 8 centimeters) is provided to the rear on the output shaft 330 (that is to say to the left in FIG. 10) after the rear shaft bearing. A switching ring (or switching cam) 37 and the eccentric cam disk 331 (thickness approximately 1.2 centimeters, radius of approximately 1.5 centimeters to approximately 3.5 centimeters) then follow to the front, whereupon the front shaft bearing follows in a manner distanced via a spacer ring 340.

Figure 6:
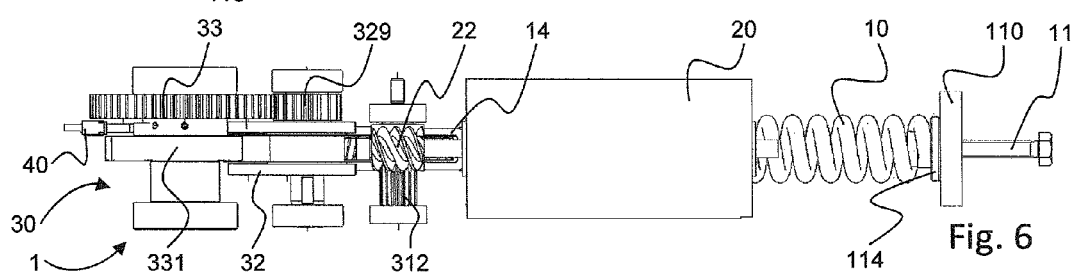
FIG. 6 shows a view of the drive module according to FIG. 4 from above without gear mechanism housing and without large intermediate gear.
Figure 7:
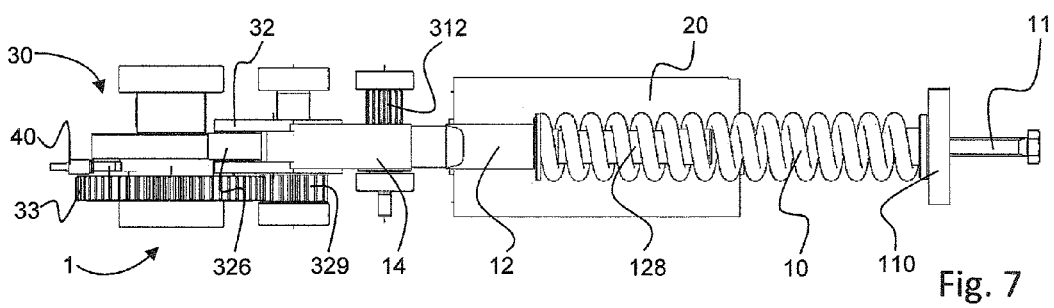
FIG. 7 shows a view of the drive module according to FIG. 6 from below.

The switching ring 37 mounted on the output shaft 330 for conjoint rotation therewith is a circumferentially asymmetrically formed ring (that is to say running with imbalance on the shaft 330), which actuates a cam switch 42 of a tactile switch 40. Here, the cam switch 42 protrudes between the eccentric cam disk 331 and the output gearwheel 33 (see FIGS. 9 and 10), is fastened on a switch 40 and engages the switching ring circumferentially, contacting the position thereof. The switch 40 is in turn fastened in the socket 41, as described above. The system can thus be referenced at any moment. Due to the arrangement of the corresponding switching ring 37 on the output shaft, all door arrangements (linkage systems) can be referenced cleanly using the same system. As can be seen in FIGS. 6-8, the output gearwheel 33 meshes with the small intermediate gearwheel 329 of the intermediate shaft 320, whereby the third shaft 330 can then also be actuated (rotated) by the motor 20.

The screw 223 and gearwheels 311, 312, 321, 329, 33, the switching ring 37, and the eccentric cam disk 331 are each fitted on the corresponding shafts 21, 310, 320, 330 for conjoint rotation therewith, the roller lever 32 being mounted in a sliding manner.

The roller lever 32 will now be described on the basis of the exploded illustration of FIG. 14. The small intermediate gearwheel 329 is mounted in the end portion of the intermediate shaft 320 (see above), and is adjoined by two ball bearings 35, between which a spacer sleeve 34 is provided, and then the large intermediate gear 321.

A roller lever limb 328 is mounted on each of the ball bearings 35 and surrounds the respective ball bearing 35 and extends downwardly in a planar manner to a roller lever end portion 327 until approximately 5 centimeters below the axis of the output shaft 330. As can be seen in FIG. 14, the plate-shaped, flat roller lever limbs 328, at the edges, each have an end face (to the front in FIG. 14) running vertically downwardly in a straight line and, approximately centrally opposite, a recess 323 protruding laterally into the lever limbs 328. A circular recess for receiving a roller axis 322 and a cam-follower roller axis 324 are formed in the roller lever end portion 327, wherein the cam-follower roller axis 324 is approximately 5 millimeters above the roller axis 322 in relation to said vertical straight end-face portion.

The roller lever limbs 328 are mounted in a manner distanced by approximately 1.5 centimeters along the shaft 320. The roller axis 322 and the cam-follower roller 326 and a lever hub 325 are located between the roller lever limbs 328, whereby the two limbs 328 are connected. The lever hub 325 additionally surrounds the spacer sleeve 34, through which the shaft 320 passes. The roller axis 322 and the cam-follower roller axis 324 run parallel to the lever hub 325 between and in the recesses of the roller lever end portions 327. The cam-follower roller 326 can be mounted on the cam-follower roller axis 325 so as to be able to roll, wherein a rolling surface of the cam-follower roller 326 protrudes to the front beyond said vertical straight end-face portion and approximately 3 millimeters downwardly. Considered from the side (see FIG. 11), the roller lever 32 thus forms an angled single lever, wherein the cam-follower roller 326 is fitted in the elbow as viewed to the left, and the roller 326 in FIG. 11 protrudes via an angular range of approximately 250 degrees as viewed substantially to the left (upwardly and downwardly), wherein the roller axis 322 is given in the lower right end portion 327 of the lever 32. It can also be seen in FIG. 11 that the roller axis 322 can rotate in or only up to 12 millimeters from the line of action of the energy spring module 112 toward the output shaft 330 (then, the cam-follower roller 326 cannot engage any deeper in the eccentric cam disk 331, and the swing upwardly is limited).

The roller lever 32 thus slides on the intermediate shaft 320 and is thus provided in a manner rotatable thereon and thereabout.

The lever 32 is pressed forward (to the left in FIG. 11) circumferentially onto the eccentric cam disk 331, that is to say on the circumferential surface 332 thereof, by the energy-store module 112 rotating about the intermediate shaft 320 with the cam-follower roller 326. By means of the rolling cam-follower roller 326 pressed on the circumferential-side rolling surface 332 of the eccentric cam disk 331, the pressure applied by the energy-store unit 112 is thus transmitted to the output shaft 330, or the torque acting from the leaf/casement onto the output shaft 330 is transmitted via pressure application to the helical spring 10.

The eccentric cam disk 331 shown by way of example in FIG. 11 is substantially heart-shaped with a rounded eccentric cam disk tip 335 and is symmetrical. The shape of the eccentric cam disk 331 determines the torque curve acting on the output shaft 330 when the spring 10 is relaxed. Here, all eccentric cam disks known to a person skilled in the art that cooperate as intended in terms of pressure with the lever 32 can be used.

The circle described by the lever 32 with a full revolution about the intermediate shafts 320 does not cross the axis of the output shaft 330; the lever 32 is thus mounted ahead of the output axis, whereby a compact design of the drive module 1 is made possible. Due to the arrangement thereof on the intermediate shaft 320, the lever 32 is formed so as to be short in such a way that a compact design is achieved.

As illustrated in FIG. 11 and described above, the roller lever 32 provides the roller axis 322 from the left, and the plunger 12 provides the press lug 124 from the right. The roller axis 322 and press lug 124 are brought into operative connection by the rigid pendulum piece 14.

The pendulum piece 14 is illustrated in FIG. 12 and can be seen in FIGS. 6-11. The pendulum piece 14 consists of a substantially elongate pendulum body 140 with a cross-sectional shape which, centrally, is substantially U-shaped (rectangular with a recess 141). Side walls 149 are formed by the recess 141 and are approximately 4 millimeters thick. The side walls 149 are connected centrally of the pendulum piece 14 via a flat base surface, which is approximately 2 to 3 millimeters thick, approximately 12 millimeters wide and just under 2 centimeters long. As can be seen in FIG. 12, the recess 141 extends upwardly over almost the entire length of the pendulum piece 14, which is just under 8.5 centimeters, and runs downwardly. In the lateral lower edge region of the recess 141 (that is to say as viewed to the left/right in FIG. 12 in cross section), the recess is in each case rounded with rounding radii from approximately 2.5 to 5 centimeters, in particular of 3.2 centimeters (the circle midpoints are in each case located above the straight central base surface of the pendulum piece 14).

The pendulum piece 14, in longitudinal extension, has a left end portion (a roller lever receiving portion 143) and a right end portion (a plunger receiving portion 142) (see FIG. 12). Here, the recess 141 extends as far as these end portions 142, 143 (see FIG. 12). In particular, the recess 141 receives an upper part of the plunger receiving portion 142 (see recess 141a in FIG. 12). This is advantageous so that, when the plunger receiving portion 142 engages with the guide 115 of the guide flange by approximately 1 to 2 centimeters, a simultaneous bend movement (or a swing movement) is possible upwardly in an unimpeded manner (see below). The pendular movement is to be approximately up to 3 degrees here, and the pivot point is the press lug 124, that is to say the pendulum piece 14 is pivoted upwardly via the left end thereof from the horizontal line of action of the energy-store module 112.

The roller lever receiving portion 143 is tapered on either side symmetrically and gradually over the width from approximately 20 millimeters to approximately 14 millimeters as viewed from above over a length of approximately 1 to 1.5 centimeters as viewed from the outer edge, whereby edges 148 running over the side faces 149 are formed externally. These edges 148 each run from top to bottom and form a partially circular recess 148a (circle segment with radius of approximately 1 centimeter) toward the pendulum body 140, wherein the circle midpoint of a circle forming the circle segments lies in the center of a further recess 147. The edges 148 are each rounded at the top and bottom (see FIG. 12).

The recess 147 protrudes centrally at the end by approximately 8.5 millimeters into the cuboidal and narrowed roller lever receiving portion 143 and is continuous from the front to the rear (see FIG. 12), such that the roller lever receiving portion 143 is fork-shaped, that is to say has a projection 143a at the top and at the bottom. In a lateral plan view, the recess 147 runs in a U-shaped manner, has a clear width of approximately 1.1 centimeters between the portions 143a, and is provided in a manner rounded in the depth (semi-circularly) with a radius with approximately 5.5 millimeters. This recess 147 corresponds as a circular cylindrical overlap with the circular cylindrical roller axis 322 (see also FIG. 10), which is received therein. The step-like narrowing of the width of the roller lever receiving portion 143 serves for engagement between the roller levers 328 distanced by approximately 1.5 centimeters (see FIG. 10), whereas the round roller lever end portions 327 engage with the recess 148a at a distance (approximately 1 millimeter) from the edge face 148. The significance of the recess 328 is now also clear on the basis of FIG. 11, since the pendulum piece 14 needs this space 323 for the intended pendular movement.

The roller lever 32 thus engages off-axis with the recess 147 in the pendulum piece 14 in a manner coupled via the roller axis 322 thereof.

The plunger receiving portion 142 extends substantially cylindrically (approximately 19 millimeters diameter) centrally from the right end face of the pendulum piece 14 over approximately 18 millimeters toward the pendulum body 140 (see FIG. 12). In particular, the plunger receiving portion 142 should also be able to engage with the guide 115 of the energy-store module 112, more specifically from the other side compared with the plunger 12 and, in doing so, should still be able to perform the intended pendular movement thereof. The cross section is thus identical to that of the plunger head portion 122 or is to be selected slightly smaller. A cylindrical recess 144 with circle segment-shaped recess (radius approximately 5 millimeters, see FIG. 12) runs from the rear to the front centrally in the right end face of the plunger receiving portion 142. This groove 144 is approximately 2 millimeters deep (runs transversely to L and horizontally) and corresponds as circular cylindrical overlap with the circular cylindrical press lug 124 of the plunger 12 (see FIG. 11). Circle segment-shaped flat end face portions 145 and 146 can be seen in FIG. 12 and are arranged opposite the recesses 125, 126 in the assembled state and engage with said recesses when the pendulum piece 14 performs the intended pendular movement thereof. The pendulum piece 14 may thus simultaneously perform a linear movement (in the horizontal by approximately 1 centimeter to 2 centimeters) and an angular movement or pendular movement (in the horizontal over the entire length of the pendulum piece 14 for example by 1 millimeter to 10 millimeters, preferably 1 millimeter to 5 millimeters). The pendular movement from the horizontal is approximately up to 3 degrees in this case.

The coupling of the pendulum piece 14 can also be produced in an alternative embodiment on one side or two sides by a spherical overlap and a spherical engagement element instead of, as described above, by a circular cylindrical overlap 144, 147 and a circular cylindrical engagement element 124, 322 or by a coupling with an axis.

As viewed from below (see FIG. 7), the pendulum piece 14 runs over the length thereof of approximately 85 millimeters between the large intermediate gearwheel 321 and the small intermediate gearwheel 329 and contacts the roller lever 32 and the plunger 12 directly. As viewed from below (see FIG. 7), a straight, direct line of action between the spring 10 and the eccentric cam disk 321 is thus provided. As viewed from the side (see FIG. 11), this operative connection is such that the plunger 12 acts via the press lug 124 in the line of action of the energy-store module 112. This line of action runs parallel to the longitudinal extension of the motor 20 and energy-store module 112, wherein the motor 20 and the energy-store module 112 in relation to the intermediate shaft 320 and in relation to the gear mechanism 30 are arranged spatially on the same side. In addition, the line of action of the energy-store module 112 runs in a straight line beneath and through the screw shaft 310, the intermediate shaft 320 and the output shaft 330. The operative connection between the energy-store module 112 and the output shaft 330 is then redirected via the press lug 124 received in the recess 144 and moving horizontally in a straight line to the pendulum piece 14 movable in a straight line and transversely thereto and mounted in a manner suitable for pendular motion vertically to the chassis 51 and is then redirected again to the roller axis 32 received in the recess 147 in the circular movement of the roller lever 32 and is directed upwardly via the roller 326 to the eccentric cam disk 331 and therefore to the output shaft 330. Here, the pendulum piece 14 swings depending on the arrangement of the intermediate shaft 320 and the length of the roller lever 32. If the roller axis 322 reaches from the intermediate shaft 320 at most to the line of action of the energy-store module, the pendulum piece 14 thus always swings upwardly from this line of action (horizontally from the press lug 124 to the left in FIG. 11) toward the output shaft 330. However, the roller lever 32 may also be 1 to approximately 5 millimeters longer, and can reach the roller axis 322 at the bottom point (maximum deflection downwardly in FIG. 11) over the line of action of the energy-store module. The pendulum piece 14 then swings downwardly over this line of action by 1 to approximately 5 millimeters.

In an alternative embodiment compared with FIG. 11, the axis of the roller axis 322 with maximum displacement of the pendulum piece 14 to the left (maximally relieved spring 10) may also lie directly vertically below the axis of the intermediate shaft 320.

Generally, the pendular movement of the pendulum piece 14 can be determined by the cooperation between length of the roller lever 32 or position of the intermediate shaft 320 and position of the coupling point between pendulum piece 14 and roller axis 322. If, for example, the distance between the axis of the roller axis 322 and the intermediate shaft 320 is exactly the same size as the vertical distance between the axis of the intermediate shaft 320 and the line of action of the energy-store module 112, the angle between the axis of the intermediate shaft 320 and the axis of the roller axis 322 and the line of action may thus also enclose 90 degrees without the pendulum piece 14 swinging downwardly over said line of action. If the axis of the intermediate shaft 320 is closer to the line of action, the intermediate shaft 320 can thus be displaced to the left by way of example (in FIG. 11), such that the angle just described always remains greater than 90 degrees and the pendulum piece 14 therefore does not swing downwardly over said line of action.

As intended, only pendular movements of the pendulum piece 14 upwardly (toward the intermediate shaft 320 and possibly the output shaft 330, if this does not lie on the line of action of the energy-store module) are therefore implemented, which allows a particularly compact design.

The movement of the drive module 1 can thus be summarized as follows:

When the motor 20 rotates the shaft 21 thereof, the screw 23 then engages with the screw gear 311, whereupon the first shaft 310 rotates the gearwheel 312. The gearwheel 312 engages with the large intermediate gearwheel 321, whereupon the second shaft 320 rotates with the small intermediate gearwheel 329 (without actuating the sliding lever 32).

The small intermediate gearwheel 329 engages with the output gearwheel 33, whereby the third shaft 330 rotates with the eccentric cam disk 331 connected thereto for conjoint rotation therewith.

The rotating eccentric cam disk 331 then actuates the roller lever 32 on account of the changing center distance between the rolling surface 332 of the eccentric cam disk 331 and the axis of the output shaft 330 via the cam-follower roller 326 pressed against the rolling surface 332. The rotating roller lever 32 acts via the roller axis 322 thereof on the pendulum piece 14 coupled to said roller axis 322 in an off-axis manner under spring pressure with the circular cylindrical overlap 147 at the proximal pendulum piece end. The pendulum piece 14 acts, with the circular cylindrical overlap 144 at the distal pendulum piece end, on the press lug 124 of the plunger 12 coupled in an off-axis manner under spring pressure so as to engage with the overlap 144, said plunger 12 then acting linearly on the spring 10. An operative connection between the output shaft 330 and spring energy store 112 is thus produced.

In an alternative embodiment, the motor 20 engages the output gearwheel 33 or a gearwheel of the intermediate shaft 320 directly (for example via a screw or a bevel gear). If a transmission gear mechanism from the motor to the output shaft is provided without use of the intermediate shaft, the intermediate shaft is thus provided substantially only for the roller lever 32.

A preferred clamping piece 60 having a lever 700 and a stop element 70 will now be described with reference to FIGS. 16-18.

Figure 16:
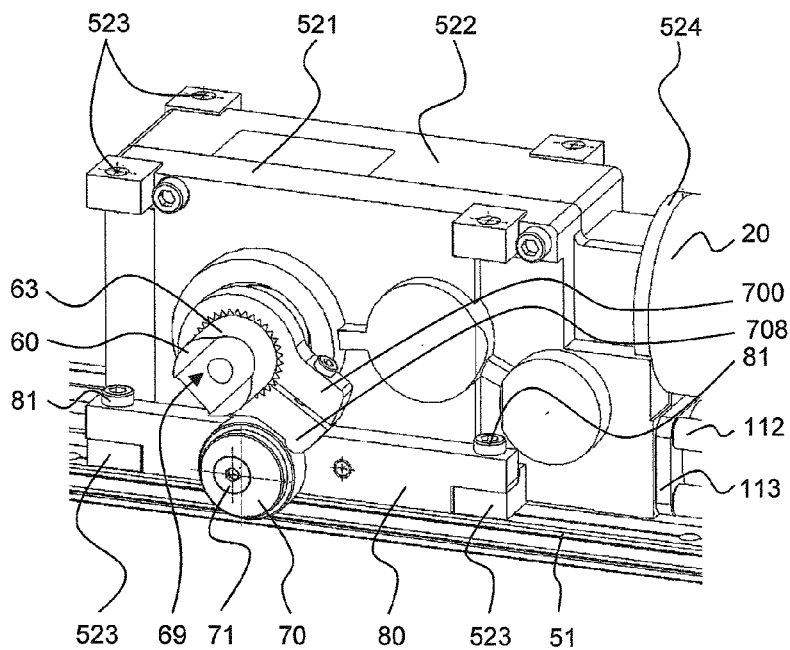
FIG. 16 shows a side view of the gear mechanism housing with a stop mechanism according to the invention comprising a clamping piece with stop finger and a stop element.

FIG. 16, in a side view, shows the gear mechanism housing 521, 522 mounted on the chassis 51. It can be seen that the substantially cylindrical clamping element 60 according to FIG. 18 is used in the linkage connection 333 (hidden in FIG. 6, but see FIG. 4 for example) and protrudes laterally beyond the gear mechanism housing 521, 522. A lever 700 with a stop finger 708 is provided on the clamping piece 60 mounted rotatably in the linkage connection 333 of the output shaft 330 for conjoint rotation with said clamping piece 60 and cooperates with the stop element 70 according to FIG. 17 and in particular limits the movement of the output shaft 330. As the output axis 330 rotates, the stop finger 708 describes a circular path.

Figure 17:
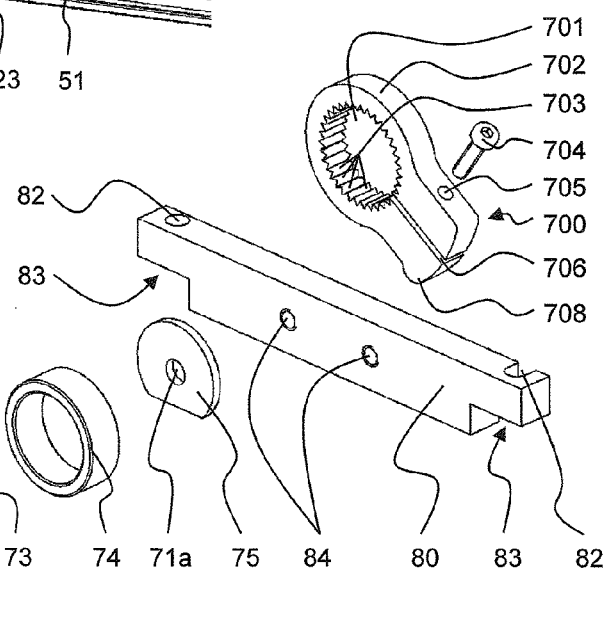
FIG. 17 shows an exploded illustration of the stop mechanism according to FIG. 16.

FIG. 17 shows the construction of the stop element 70 according to FIG. 16. A screw 71 (for example M6) passes through a substantially cylindrical stop cam 72 through a non-central hole 71a. The screw 71 also passes through a damping element 73 in the form of a hollow cylinder, a stop ring 74, a preferably centrally drilled stop disk 75, and is in fixed threaded engagement with a threaded hole 84 in a bar-shaped stop support 80. A screw head of the screw 71 then clamps the stop cam 72 and thus the further elements 73, 74, 75 detachably on the stop support 80. The stop element 70 is then rotatable once the screw 71 has been slightly loosened and can be clamped again in another position.

Here, the stop cam 72 is a disk approximately 2 millimeters to 5 millimeters thick with a diameter of approximately 3 centimeters. A center of the hole 71a is radially offset outwardly by approximately 1 to 5 millimeters from the disk center and is provided on the outer face (visible in FIGS. 16 and 17) with a countersink for the screw head. Due to this offset of the hole 71a relative to a center of the disk, the stop point for the stop finger 708 can be shifted circumferentially on the effective circle of the stop finger 708 when the screw 71 has been loosened.

A cylinder with an outer diameter of approximately 2 centimeters protrudes centrally on the opposite side of this disk, the hole 71a passing through said cylinder. The hollow-cylindrical damping element 73 preferably made of rubber is then slid onto this cylinder. The stop ring 74 is then slid onto this damping element 73, preferably with an accurate fit (outer diameter approximately 3.2 to 3.5 centimeters, such that it protrudes beyond the disk of the cam element). The stop ring 74 provides the lateral stop face for the stop finger 708 protruding from the gear mechanism housing 521, 522. Here, the stop finger 708 can be curved slightly outwardly laterally in the stop region. The stop ring 74 is damped with respect to lateral contact by the damping element 73. The stop support 80 is then contacted via a downwardly flattened (circle segment-shaped recess, see FIG. 17) stop disk 75 drilled centrally for the screw 71 and measuring approximately 1 to 4 millimeters thick and approximately 3 centimeters in diameter. The flattened side of this disk 75 contacts the chassis 51 in a planar manner. The screw 71 is screwed tightly in a threaded hole 84 in the stop support 80. A person skilled in the art knows to place the holes 84 in the stop support 80 in accordance with requirements imposed by the situation in question, such that the screw 71 is attached, for example in accordance with FIG. 16, beneath the output shaft 330 in a manner offset for example by 1 to 8 millimeters to the left in relation to the axis thereof (see FIG. 16).

The stop support 80 is a bar approximately 14 centimeters long of rectangular cross-sectional shape (approximately 1 centimeter by 2 centimeters), which is screwed via a narrow long side onto the chassis 51 (see FIG. 16). To this end, holes 82 are provided in the stop support 80, and screws 81 can be inserted into said holes so as to fix the support 80 on the chassis. The stop support 80 extends along the gear mechanism housing 521, 522 and is placed between the fastening means 523 of the gear mechanism housing 521, 522 and has recesses 83 in the lower lateral end regions in order to receive the fastening means 523. The support 80 and the gear mechanism housing 521, 522 are thus screwed tightly on the chassis 51.

The stop support 80 comprises the holes 84 approximately centrally relative to the height of the front side of said stop support, wherein two laterally spaced holes 84 (for example M6) are provided in such a way that the same support can be used on the front side (housing part 521) and on the rear side (housing part 522). This is advantageous since the output shaft 330 is not located centrally relative the fastening means 523.

The stop element 70 fastened in such a way on the stop support 80 can now be rotated with loosened screw 71, wherein the stop face of the stop ring 74 can be displaced continuously circumferentially with respect to the effective circle of the stop finger 708 thanks to the eccentric construction. A fine adjustment of the stop position is thus provided.

In addition, FIG. 17 to the right shows the lever 700, which will now be described together with the clamping piece 60 according to FIG. 18. The clamping piece 60 transmits the torque from the output shaft 300 to the linkage (not illustrated in the figures) for actuation of the corresponding leaf/casement. The clamping piece 60 has a substantially cylindrical main body 62 (diameter approximately 3 centimeters, length approximately 5 centimeters), which extends from an engagement portion 67 to a connection element 63. A cylinder axis of the main body 62 runs identically with the axis of rotation of the output shaft 330 when the clamping piece 60 is inserted into the linkage connection 333.

The engagement portion 67 is formed conically and concentrically about the cylinder axis and has 8 combs or teeth 68, which run along the cylinder axis over the lateral surface of the engagement portion 67. The engagement portion 67 is formed in a manner complementary to the conically formed and furrowed linkage connection 333 for form-fitting engagement.

The linkage connection 333 has three times as many teeth, specifically 24 in number. The teeth 68 of the engagement element 67 then engage via the tips thereof with the substantially triangular recess between the teeth of the linkage connection 333. The clamping element 60 can thus be inserted into the linkage connection 333 in a manner rotated about the cylinder axis of the clamping element by 15 degrees (or integer multiples thereof) from an insert position. In order to fasten the clamping piece 60 in the linkage connection 333, the clamping piece 60 has a longitudinal bore 61, into which a screw for clamping the clamping piece in the linkage connection 333 can be inserted.

A toothing 64 comprising 35 individual teeth 65 approximately 1.8 millimeters high protrudes laterally circumferentially on the main body 62 approximately centrally with respect to the length of the main body 62. These teeth are approximately 2 millimeters high and extend over the lateral surface of the main body 62 approximately 7 millimeters along the cylinder axis of the main body 62.

Figure 18:
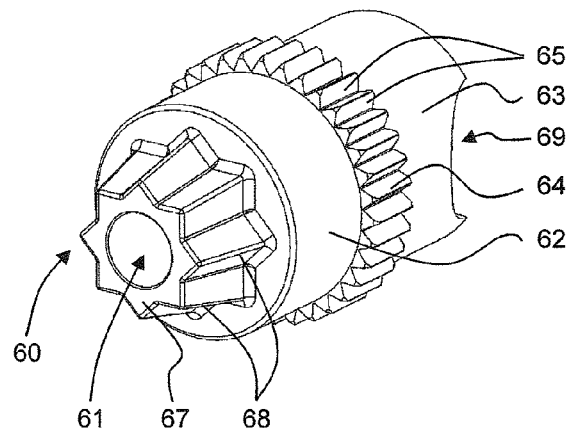
FIG. 18 shows a side view of the clamping piece according to the invention according to FIG. 16.

The cylindrical connection portion, which on the end face provides a convex recess 69 (approximately semi-circular segment-shaped with a circle diameter of 1.6 centimeters) for receiving the linkage is provided at the end face on the cylindrical main body 62 on the side of the clamping piece 60 opposite the engagement portion 67 (see FIGS. 16 and 18).

The lever 700 to the right in FIG. 17 is approximately 6 centimeters long in total and approximately 3 centimeters wide at the front and approximately 8 millimeters thick. It has a lever ring 702 with a recess 701. The lever ring 701 comprises the main body 62 of the clamping piece 60 (see FIG. 16), wherein the recess 701, through which the clamping piece 60 is guided, has a toothing 703, which corresponds in a complementary manner to the toothing of the clamping piece 60 as a spline. The stop finger 708 protruding laterally on one side has a radially running slit 706 that is continuous to the recess 701 and to the outside (see FIG. 16). This slit 706 is approximately 2 to 3 millimeters wide. A bore 705 running transversely to the slit 706 is provided on the lateral narrow side on the stop finger 708. A screw 704 (for example M4) is introduced laterally into the lever 700 through this bore 705 and is present externally on the lever 700 with a screw head and passes via the slit 706 into the opposite part of the stop finger 708 and is in threaded engagement therewith. By tightening the screw 705 the slit 706 is narrowed and a diameter of the recess 70 reduces. The lever 700 can therefore be clamped on the main body 62 for conjoint rotation therewith and in a form-fitting manner.

The linkage and the clamping piece 60 are fixed or clamped to the output shaft 330 by a further screw. The linkage and the clamping piece 60 have a bore 61 of corresponding size (approximately 8 millimeters in diameter) parallel to the cylinder axis of the main body 62 in order to pass through the screw. Since the torque is transmitted in a form-fitting manner (conical spline) from the output shaft 330 to the clamping piece 60 and further to the linkage, and since the screw only clamps the element, the screw is ideally also only subject to tensile load.

As can be seen in FIG. 16, the stop element 70 can now be released via the screw 71 and rotated, for example 5 to 20 degrees, wherein the stop point of the stop finger 708 is then displaced continuously upwardly or downwardly. The stop point along the effective circle of the stop finger 708 is therefore displaced. An extreme angle of aperture of the leaf/casement can thus be adjusted roughly via the toothing 64, 703, and the fine adjustment can be achieved continuously by corresponding rotation of the stop element 70.

| List of reference signs | |
| --- | --- |
| 1 | drive module |
| 10 | compression spring |
| 100 | door drive |
| 11 | adjustment screw |
| 110 | spring flange |
| 111 | connection rods |
| 112 | spring energy-store module |
| 113 | guide flange |
| 114 | spring press piece |
| 115 | hollow-cylindrical guide |
| 12 | spring plunger |
| 120 | plunger body |
| 121a, 121b | stop faces |
| 122 | plunger head portion |
| 123 | undercut |
| 124 | press lug |
| 125, 126 | recess |
| 127 | spring stop |
| 128 | guide portion |
| 14 | pendulum piece |
| 140 | pendulum piece body |
| 141 | longitudinal recess |
| 141a | recess |
| 142 | plunger receiving portion |
| 143 | roller lever receiver portion |
| 144 | recess |
| 145, 146 | end face |
| 147 | recess |
| 148 | edge |
| 148a | recess |
| 149 | side wall |
| 20 | motor |
| 20a | motor body |
| 21 | motor shaft |
| 23 | screw |
| 24 | connection cable |
| 30 | gear mechanism |
| 310 | screw gear shaft |
| 311 | screw gear |
| 312 | gearwheel |
| 32 | roller lever |
| 320 | intermediate shaft |
| 321 | large intermediate gearwheel |
| 322 | roller axis |
| 323 | recess |
| 324 | cam-follower roller axis |
| 325 | lever hub |
| 326 | cam-follower roller |
| 327 | roller lever end portion |
| 328 | roller lever limb |
| 329 | small intermediate gearwheel |
| 33 | output gearwheel |
| 330 | output shaft |
| 331 | eccentric cam disk |
| 332 | rolling surface |
| 333 | conical linkage connection |
| 335 | eccentric cam disk tip |
| 34, 340 | spacer sleeve |
| 35 | sliding bearing |
| 36 | feather key |
| 40 | electric switch |
| 41 | socket |
| 42 | switching lug |
| 51 | chassis |
| 52 | casing |
| 521 | first housing shell |
| 521a | opening for output shaft |
| 522 | second housing shell |
| 522a | opening for output shaft |

-continued

List of reference signs

| | |
|---|---|
| 523 | fastening means |
| 524 | housing flange |
| 53, 54 | side element |
| 530 | rotary transducer |
| 55 | recess |
| 56a | mains device |
| 56b | controller |
| 60 | clamping piece |
| 61 | bore |
| 62 | main body |
| 63 | connection portion |
| 64 | toothing |
| 65 | tooth |
| 67 | engagement portion |
| 68 | toothing |
| 69 | recess |
| 70 | stop element |
| 71 | screw |
| 71a | bore |
| 72 | stop cam |
| 73 | damping |
| 74 | stop ring |
| 75 | stop disk |
| 700 | lever |
| 701 | recess |
| 702 | lever ring |
| 703 | toothing |
| 704 | screw |
| 705 | bore |
| 706 | slit |
| 708 | stop finger |
| 80 | stop support |
| 81 | screw |
| 82 | bore |
| 83 | recess |
| 84 | bore |

The invention claimed is:

1. A rotary drive for at least one leaf/casement, comprising:
   at least one output shaft for coupling to the at least one leaf/casement;
   at least one motor, which acts on the output shaft via at least one downstream gear mechanism;
   an energy-store module, which has a linear line of action and which uses transmission elements to apply pressure circumferentially to an eccentric cam disk arranged on the output shaft for conjoint rotation therewith; and
   an intermediate shaft, which is offset in relation to the line of action of the energy-store module and which is provided, in relation to the line of action of the energy-store module, between the motor and the output shaft,
   wherein the transmission elements comprise a roller lever, which is rotatably mounted on the intermediate shaft and has a cam-follower roller spaced apart from the intermediate shaft,
   wherein the cam-follower roller, pressed circumferentially against the eccentric cam disk, interacts with the output shaft, and the energy-store module is arranged on the motor side in relation to the intermediate shaft,
   wherein the transmission elements also comprise a pendulum piece, wherein the pendulum piece extends between the roller lever and the energy-store module and is coupled both to the roller lever and to the energy-store module.

2. The rotary drive as claimed in claim 1, wherein the line of action of the energy-store module is offset in relation to the output shaft, and in that the output shaft is arranged on the same side of this line of action as the intermediate shaft.

3. The rotary drive as claimed in claim 1 wherein the pendulum piece is coupled in an off-axis manner to the roller lever and the energy-store module, wherein the pendulum piece provides an overlap for the respective reception of a corresponding engagement element of the roller lever and of the energy-store module.

4. The rotary drive as claimed in claim 1, wherein the intermediate shaft is an intermediate shaft of the gear mechanism and is arranged, in the direction of the line of action of the energy-store module, between the output shaft and the point at which the energy-store module is coupled to the pendulum piece.

5. The rotary-leaf/-casement drive as claimed in claim 1, wherein the roller lever does not cross an axis of the output shaft in any position.

6. The rotary drive as claimed in claim 1, wherein the roller lever is a one-armed lever, wherein the cam-follower roller is offset in the direction transverse to the effective direction of the energy-store module.

7. The rotary drive as claimed in claim 1, wherein the gear mechanism provides a transmission from the motor side to the output side to higher forces.

8. The rotary drive as claimed in claim 1, wherein the pendulum piece swings from the line of action of the energy-store module toward the output shaft.

9. The rotary drive as claimed in claim 1, wherein the energy-store module is a spring energy-store module comprising a compression spring.

10. The rotary drive as claimed in claim 9, wherein the energy-store module is pre-stressed between a spring flange and a guide flange.

11. The rotary drive as claimed in claim 10, wherein an adjustment screw passing through the spring flange with threaded engagement is provided and acts on a spring press piece which is provided between the spring flange and resting at the end face against the compression spring, whereby a pre-stress of the compression spring can be adjusted.

12. The rotary drive as claimed in claim 9, wherein the compression spring is coupled via a plunger to the pendulum piece, wherein a movement of the plunger is guided linearly by a guide.

13. The rotary drive as claimed in claim 1, wherein the eccentric cam disk is circumferentially symmetrical.

14. The rotary drive as claimed in claim 1 for at least one door leaf or a window casement.

15. The rotary drive as claimed in claim 3, wherein the overlap is circular cylindrical or spherical.

16. The rotary drive as claimed in claim 4, wherein the intermediate shaft is distanced further perpendicularly from the line of action of the energy-store module than the output shaft.

17. The rotary drive as claimed in claim 4, wherein the pendulum piece has a recess for the engagement of elements of the gear mechanism.

18. The rotary drive as claimed in claim 6, wherein the cam-follower roller is offset in the direction transverse to the effective direction of the energy-store module between the intermediate shaft and the point at which the pendulum piece is coupled to the roller lever.

19. The rotary drive as claimed in claim 18, wherein the cam-follower roller is offset with respect to the output shaft.

20. Method of using the rotary drive as claimed in claim 1 for the actuation of window casements or door leaves.

* * * * *